June 26, 1923.

J. H. FROST 1,460,238

AUTOMOBILE LOCK

Filed April 11, 1922

INVENTOR
Julius H. Frost
BY
ATTORNEYS

WITNESSES

Patented June 26, 1923.

1,460,233

UNITED STATES PATENT OFFICE.

JULIUS H. FROST, OF NEW YORK, N. Y.

AUTOMOBILE LOCK.

Application filed April 11, 1922. Serial No. 551,603.

*To all whom it may concern:*

Be it known that I, JULIUS H. FROST, a citizen of the United States, and a resident of the city of New York, borough of the Bronx, in the county of Bronx and State of New York, have invented a new and Improved Automobile Lock, of which the following is a full, clear, and exact description.

This invention has relation to anti-theft devices for motor vehicles and refers more particularly to a lock which when in operative position coacts with the lever of the emergency brake to retain the same in braking position.

As an object of the invention contemplates a locking element which coacts and confines the emergency brake lever in a position to render the emergency brake operative, and to prevent unauthorized shifting of the same to its released position without resorting to methods liable to attract attention.

As a further object the invention contemplates a simple and inexpensive locking device of the character described which may be readily installed on vehicles now in use without requiring material alteration.

With the above recited and other objects in view, the invention resides in the novel construction set forth in the following specification, particularly pointed out in the appended claim and illustrated in the accompanying drawings, it being understood that the right is reserved to embodiments other than those actually illustrated herein to the full extent indicated by the general meaning of the terms in which the claim is expressed.

In the drawing—

Figure 1:
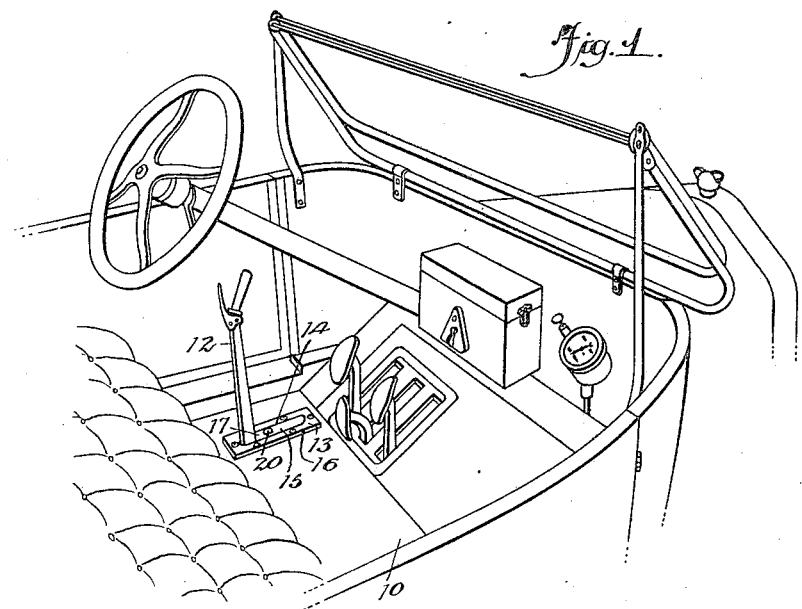
Figure 1 is a fragmentary perspective view of an automobile equipped with the emergency brake lever lock device.
Figure 2:
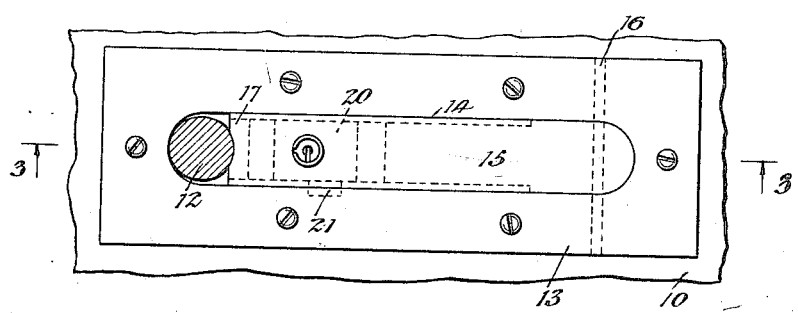
Fig. 2 is a fragmentary enlarged plan view thereof.
Figure 3:
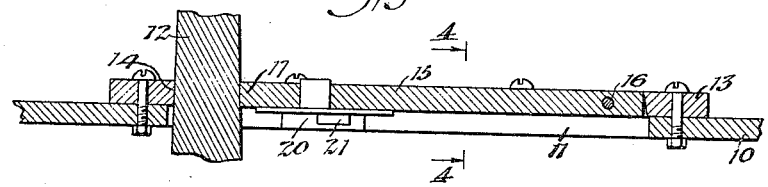
Fig. 3 is a longitudinal sectional view taken approximately on the line 3—3 of Fig. 2.
Figure 4:
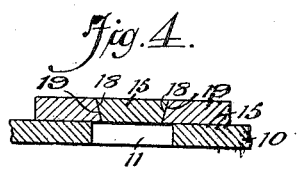
Fig. 4 is a transverse sectional view taken approximately on the line 4—4 of Fig. 3.

Referring to the drawings by characters of reference, 10 designates the floor of the vehicle adjacent the operator's seat, which is slotted as at 11 to accommodate the emergency brake lever 12 and permits of the shifting of the same for the purpose of applying or removing the emergency brake. In practice the brake lever 12 is shifted to the rear end of the slot when the brake is in applied position and is shifted to the forward end of the slot when the brake is in released position. The locking device constituting the invention comprises a plate 13 which is slotted as at 14 and is secured to the floor 10 with the slot 14 registering with the slot 11 on the floor. A locking bar 15 is pivoted at its forward end as 16 within the slotted portion of the plate 13 and the free rear terminal 17 thereof terminates from the rear end of the slot 14 an appropriate distance to afford a space to snugly receive and accommodate the emergency brake lever 12 when the lock bar is swung to a position to lie wholly within the slot 14. In order to prevent downward swinging of the extremity 17 through the slot 14, the side edges of the lock bar are beveled inwardly and downwardly as at 18 and the slot 14 is provided with complementary beveled side edges 19. A suitable lock 20 is carried by the under side of the free extremity 17 of the lock bar and the same is provided with a bolt 20 which is designed to extend laterally from the lock bar into a keeper 22. The lock 20 may be of any suitable type such as a key actuated spring lock or a permutation lock.

In use and operation, when the operator of the vehicle leaves the same unguarded, the emergency brake is applied by shifting the emergency brake lever 12 to the rear end of the slot 14 and the lock bar 15 is swung downwardly within the slot 14 whereby the free extremity 17 thereof will coact with the lever 12 to prevent forward shifting thereof and release of the emergency brake. As the lock bar assumes this position, the latch bolt 21 will engage the keeper 22 to preclude the swinging of the lock bar to the release position, thereby effectively defeating attempts to operate the vehicle without manipulating the lock 20. When the authorized person desires to operate the vehicle, the key is associated with the lock 20, the bolt 21 is shifted to disengage the same from the keeper by said key, and the lock bar 15 is swung upwardly and forwardly to an out-of-the-way position to permit of the shifting of the emergency brake lever to a position at the forward end of the slot whereby the emergency brake is released.

It will thus be seen that a simple and effective lock for motor vehicles has been provided which may be readily installed on vehicles now in use without materially altering the same and which when installed serves as a simple and efficient lock against unauthorized operation of the vehicle.

I claim:

In an automobile lock, the combination with a slotted member having an operating lever extending through the slot, of a slotted plate secured to the member with its slot registering with the slot of said member and through which the operating lever also extends, a locking bar fitting in the slot of the plate and mounted at one end on a horizontal pivot at one end of the slot to swing in and out of said slot, the bar being of the length of the slot less the size of the operating lever, whereby when the bar is in the slot its free end will engage the operating lever and hold it in engagement with an end of the slot, and a lock secured to the under face of the free end of the locking bar, the bolt of the lock being engageable under the said plate.

JULIUS H. FROST.